(12) United States Patent
Rohr et al.

(10) Patent No.: US 12,405,709 B2
(45) Date of Patent: *Sep. 2, 2025

(54) GRAPHICAL USER INTERFACE FOR CONFIGURING CARD CONTROLS FOR A CARD

(71) Applicant: Truist Bank, Charlotte, NC (US)

(72) Inventors: Robert Rohr, Charlotte, NC (US); Selcuk Karakaplan, New York, NY (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,169

(22) Filed: Jul. 16, 2024

(65) Prior Publication Data

US 2024/0370139 A1    Nov. 7, 2024

Related U.S. Application Data (63) Continuation of application No. 18/468,104, filed on Sep. 15, 2023, now Pat. No. 12,079,450, which is a continuation of application No. 17/980,226, filed on Nov. 3, 2022, now Pat. No. 11,797,156, which is a continuation of application No. 17/719,998, filed on Apr. 13, 2022, now Pat. No. 11,550,450.

(51) Int. Cl.
*G06F 3/0482* (2013.01)
*G06F 3/04817* (2022.01)
*G06Q 20/36* (2012.01)

(52) U.S. Cl.
CPC ........ *G06F 3/0482* (2013.01); *G06F 3/04817* (2013.01); *G06Q 20/363* (2013.01)

(58) Field of Classification Search
CPC . G06F 3/0482; G06F 3/04817; G06Q 20/363; G06Q 20/425
See application file for complete search history.

(56) References Cited

U.S. PATENT DOCUMENTS

| | | | |
|---|---|---|---|
| 11,367,064 B1* | 6/2022 | Techel | G06Q 20/34 |
| 11,386,223 B1* | 7/2022 | Fakhraie | G06F 9/547 |
| 2007/0067446 A1* | 3/2007 | Jones | H04L 47/70 709/224 |
| 2014/0006277 A1* | 1/2014 | Rao | G06Q 20/3572 705/41 |
| 2017/0278092 A1* | 9/2017 | Simanek | G07B 15/04 |
| 2020/0314086 A1* | 10/2020 | Zeck | G06F 3/0482 |
| 2021/0158348 A1* | 5/2021 | Wardman | H04W 4/24 |
| 2023/0047509 A1* | 2/2023 | Dhodapkar | G06Q 20/24 |

* cited by examiner

*Primary Examiner* — Mong-Shune Chung
(74) *Attorney, Agent, or Firm* — Kilpatrick Townsend & Stockton LLP; Michael A. Springs, Esq.

(57) ABSTRACT

Card controls can be selectively applied by a user to a card using a graphical user interface (GUI). The card controls can dictate whether network requests associated with usage of the card are to be handled using an account subsystem or a service subsystem. For example, the user can input a first selection to the GUI for applying a first card control in relation to a first type of network request. Based on the first selection, the system can be configured to complete network requests of the first type using the service subsystem. The user can also input a second selection to the GUI for applying a second card control in relation to a second type of network request. Based on the second selection, the system can be configured to complete network requests of the second type using the account subsystem.

20 Claims, 5 Drawing Sheets

GRAPHICAL USER INTERFACE FOR CONFIGURING CARD CONTROLS FOR A CARD

CROSS-REFERENCE TO RELATED APPLICATION

This application is a continuation of U.S. Ser. No. 18/468,104 filed Sep. 15, 2023, which is a continuation of Ser. No. 17/980,226 filed Nov. 3, 2022, now U.S. Pat. No. 11,797,156, which is a continuation of U.S. Ser. No. 17/719,998 filed Apr. 13, 2022, now U.S. Pat. No. 11,550,450, and titled "Graphical User Interface For Configuring Card Controls for A Card," the entirety of each of which is hereby incorporated by reference herein.

TECHNICAL FIELD

The present disclosure relates generally to controlling the operation of cards. More specifically, but not by way of limitation, this disclosure relates to a graphical user interface for configuring card controls for a card.

BACKGROUND

A service provider can have a computing system through which end users can access and make use of accounts hosted with the service provider. The end users may interact the computing system to monitor or perform functions using their accounts. For example, an end user may execute a mobile application to access a mobile interface through which the end user can monitor his account and perform functions using his account. The mobile application can interact with one or more backend servers of the computing system, where the backend servers are configured to support the mobile application. Alternatively, the computing system can include one or more web servers that are configured provide a web interface through which the end user can monitor his account and perform functions using his account via a web browser.

SUMMARY

One example of the present disclosure includes a system comprising one or more processors and a memory including program code that is executable by the one or more processors for causing the one or more processors to performed operations. The operations can include providing a graphical user interface through which a user can apply card controls in relation to a card. The card controls can dictate whether network requests associated with usage of the card are to be handled using an account subsystem hosted by a service provider or a service subsystem hosted by the service provider. The operations can include receiving, through the graphical user interface, a first selection from the user for applying a first card control in relation to a first type of network request. The first card control can be configured for causing the first type of network request to be handled using the service subsystem. The operations can include, in response to receiving the first selection, configuring the system to complete the first type of network request using the service subsystem. The operations can include receiving, through the graphical user interface, a second selection from the user for applying a second card control in relation to a second type of network request. The second card control can be configured for causing the second type of network request to be completed using the account subsystem. The account subsystem can be different from the service subsystem. The operations can include, in response to receiving the second selection, configuring the system to complete the second type of network request using the account subsystem.

Another example of the present disclosure can include a non-transitory computer-readable medium comprising program code that is executable by one or more processors of a system for causing the one or more processors to performed operations. The operations can include providing a graphical user interface through which a user can apply card controls in relation to a card. The card controls can dictate whether network requests associated with usage of the card are to be handled using an account subsystem hosted by a service provider or a service subsystem hosted by the service provider. The operations can include receiving, through the graphical user interface, a first selection from the user for applying a first card control in relation to a first type of network request. The first card control can be configured for causing the first type of network request to be handled using the service subsystem. The operations can include, in response to receiving the first selection, configuring the system to complete the first type of network request using the service subsystem. The operations can include receiving, through the graphical user interface, a second selection from the user for applying a second card control in relation to a second type of network request. The second card control can be configured for causing the second type of network request to be completed using the account subsystem. The account subsystem can be different from the service subsystem. The operations can include, in response to receiving the second selection, configuring the system to complete the second type of network request using the account subsystem.

Yet another example of the present disclosure include a method involving providing a graphical user interface through which a user can apply card controls in relation to a card. The card controls can dictate whether network requests associated with usage of the card are to be handled using an account subsystem hosted by a service provider or a service subsystem hosted by the service provider. The method can involve receiving, through the graphical user interface, a first selection from the user for applying a first card control in relation to a first type of network request. The first card control is configured for causing the first type of network request to be handled using the service subsystem. The method can involve, based on receiving the first selection, configuring a system to complete the first type of network request using the service subsystem. The method can involve receiving, through the graphical user interface, a second selection from the user for applying a second card control in relation to a second type of network request. The second card control can be configured for causing the second type of network request to be completed using the account subsystem. The account subsystem can be different from the service subsystem. The method can involve, based on receiving the second selection, configuring the system to complete the second type of network request using the account subsystem. The method can be implemented by one or more processors of the system.

DETAILED DESCRIPTION

Certain aspects and features of the present disclosure relate to a graphical user interface (GUI) through which an end user of a card can selectively apply card controls to the card. Examples of the card can include a physical card or a digital card. The card controls can dictate whether network requests associated with usage of the card are to be handled using an account subsystem or a service subsystem, where the account subsystem and the service subsystem are operated by the service provider that is different than the end user. The account subsystem can complete (e.g., fulfill) the network requests using an account of the end user that is hosted by the service provider. The service subsystem can complete the network requests using a service that is provided by the service provider separately from the account. As one particular example, the user can input a first selection to the GUI for applying a first card control in relation to a first type of network request. The user can also input a second selection to the GUI for applying a second card control in relation to a second type of network request. Based on the first selection and the second selection, the system can configure itself to complete network requests of the first type using the service subsystem and network requests of the second type using the account subsystem. Subsequent network requests can then be automatically routed to the account subsystem or the service subsystem based on the user's selections. In this way, the graphical user interface can allow the end user can control which types of network requests are to be completed using their account and which types of network requests are to be completed using the provided service.

In some examples, the service provider may generate and transmit the graphical user interface to a user device of the end user, so that the end user can selectively control which network requests are to be handled using their account and which network requests are to be handled using the provided service. Based on the user's selections, the service provider can configure a routing application to automatically forward network requests to the appropriate computer subsystem. It will be appreciated that the network requests may be transmitted from any suitable source. For example, the network requests may be transmitted by a user device of the user, the service provider, or a third party that is different from the service provider and the user.

In some examples, the service provider can determine whether the end user is eligible for the service prior to activating the service for the end user. The service provider may determine whether the end user is eligible for the service by analyzing usage data relating to the user's account. The usage data may include inflows and outflows relating to the user's account during a selected time period. The analysis may be performed using a model, such as a machine-learning model. Examples of a machine-learning model can include a neural network, a Naive Bayes classifier, or a support vector machine. The model can analyze the usage data (e.g., account history) and generate an output indicating whether the end user is eligible for the service. If the end user is eligible for the service and the service is not currently activated for the user, the service provider may activate the service for the user. If the end user is eligible for the service and the service is already activated for the user, the service provider may maintain the service as active for the user. If the end user is not eligible for the service and the service is currently activated for the user, the service provider may deactivate the service for the user. If the end user is not eligible for the service and the service not currently activated for the user, the service provider may maintain the service as deactivated for the user. Over time, the service provider may periodically reassess whether the end user is eligible for the service and activate or deactivate the service accordingly. The graphical user interface can be updated to include a visual notification of whether or not the service us activated at a given point in time.

In some examples, the service provider can provide a notification to the end user indicating their eligibility for the service, prior to the service being activated. The notification may be provided as a visual notification within the graphical user interface or through other notification means. The end user may then respond to the notification by approving or disapproving the service. The service may only be activated if the end user approves the service. In some examples, the end user may need to apply a digital signature to a digital document to approve the service.

Network requests may be initiated by the end user using a card to obtain access to a resource. For example, the end user may slide the card through a card reader or otherwise use the card to interact with an endpoint device positioned at a physical location to access to a resource. Based on the card interaction, the endpoint device can generate and transmit a network request to the service provider for processing. The routing application of the service provider may receive the network request, determine one or more characteristics of the network request, and route the network request to one of the computer subsystems based on the one or more characteristics of the network request and the selections made by the end user.

Some examples of the present disclosure can provide end users with a higher degree of flexibility and control over usage of their cards. For example, in a conventional scenario, a service provider may provide a card to an end user. The card is linked to the user's account with the service provider, and the service provider's computer system handles all network requests relating to the card by using the user's account. There is no capability for the end user to selectively control which network requests should be routed between various computer subsystems that handle the network requests in different ways.

Some examples of the present disclosure can overcome one or more of the abovementioned problems by allowing an end user, that has an account hosted by a service provider, to apply card controls to their card. With these card controls, the user can dictate how requests (e.g., network requests corresponding to transactions) associated with card usage are routed through the service provider. For example, the end user can select that some types of requests are to be handled using the user's account and other types of requests are to be handled using a service offered by the service provider, where the service is distinct from the user's account. This can dictate which computer subsystems handle such requests. Through this process, the end user is provided with a greater level of control, and a more granular level of control, than may otherwise be possible. And as mentioned above, the routing feature may be closely monitored and controlled to prevent abuse of the system. For example, the end user may be prevented from using the routing feature until the computer system determines that the end user is eligible to do so, for example based on an analysis of the user's account history. This can be dynamic such that the end user's account history is periodically reassessed and the routing feature is enabled or disabled accordingly, to improve the security of the system.

These illustrative examples are given to provide the reader with the general subject matter discussed here and are not intended to limit the scope of the disclosed concepts. The following sections describe various additional features and examples with reference to the drawings in which like numerals indicate like elements.

Figure 1:
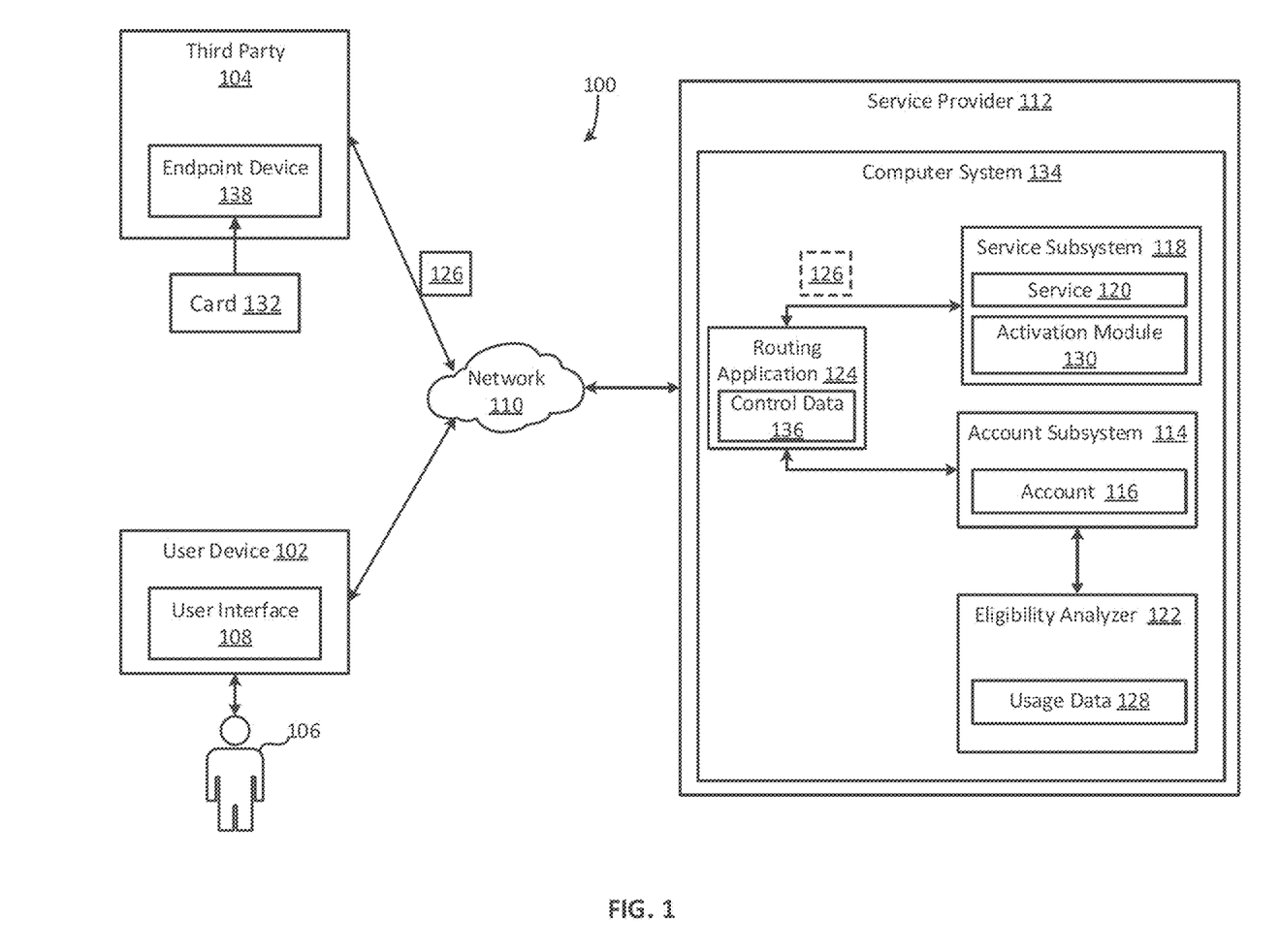
FIG. 1 is a block diagram of an example of a system for implementing some aspects of the present disclosure.

FIG. 1 is a block diagram of an example of a system 100 for implementing some aspects of the present disclosure. The system 100 includes a service provider 112 that can operate a computer system 134. In some examples, the computer system 134 may be a distributed computer system, such as a cloud computing system or a computing cluster, formed from one or more nodes (e.g., physical or virtual servers) that are in communication with one another via a network. Examples of the network can include a local area network or the Internet. The computer system 134 can be formed from a physical infrastructure that includes various network hardware, such as routers, hubs, bridges, switches, and firewalls. The physical infrastructure can also include one or more servers through which a user 106 can perform account functions related to an account 116. The servers may provide backend support for a mobile application or may provide a web interface for enabling the user 106 to perform the account functions. In some examples, the servers may be part of, or otherwise interface with, an account subsystem 114 configured to effectuate the account functions.

A user may establish an account 116 with the service provider 112 for use in performing various functions. The account 116 may be of any suitable type. For example, the service provider 112 may be a bank and the account 116 may be a deposit account. The process of establishing the account 116 may require the user to fill out forms for security purposes. After establishing the account 116 with the service provider 112, the user 106 may use the account to perform various functions. For example, the user 106 may use the account 116 to obtain access to various resources, such as physical objects or virtual objects. Examples of the physical objects can include food, clothing, and electronics. Examples of the virtual objects can include software, videos, and music files.

In some examples, the user 106 may use the account 116 to obtain access to resources of a third party 104 that is different from the user 106 and the service provider 112. For example, the user 106 may use a card 132 to interact with an endpoint device 138 of a third party 104 for accessing a resource provided by the third party 104. An example of the endpoint device 138 can be a card reader or hub. The card may be linked to the account 116 and may be provided by the service provider 112. Examples of the card 132 can include a digital card or a physical card, such as a debit card or a key card for controlling access to a physical location. In some examples in which the card 132 is a physical card, the card 132 may be a smart card with contactless technology. The third party 104 can respond to such user interactions by transmitting one or more requests 126 (e.g., network requests) to the computer system 134. For example, the endpoint device 138 can transmit the requests 126 via a network 110, such as the Internet, to the computer system 134. In turn, the computer system 134 can respond to the requests 126 by performing one or more account functions related to the account 116, such as reducing a balance in the account 116.

The user 106 may also provide resources to the account 116 over time. For example, the user 106 may deposit funds into the account at periodic intervals. Alternatively, an entity that is distinct from but associated with the user 106 may provide resources to the account. One example of such an entity may be an employer of the user 106. Usage of the account 116 may result in inflows to and outflows from the account 116.

Separately from establishing the account 116, the user 106 may register for an online account with the service provider 112 for use in monitoring and performing functions related to the underlying account 116. For example, the user 106 may go through a signup process to register an online account with the computer system 134. The user 106 may then link the online account to the underlying account 116 hosted by the service provider 112. In some such examples, the online account can be distinct from the underlying account 116 and may be used to access the computer system 134 to perform account functions related to the underlying account 116.

The user 106 can register the online account and otherwise interact with the computer system 134 via a user device 102. Examples of the user device 102 can include a mobile phone, a laptop computer, a desktop computer, or a smart watch. The user device 102 can interact with the computer system 134 via the network 110.

The service provider 112 can provide a user interface 108 (e.g., a graphical user interface) to the user 106 for controlling the account 116. The user 106 can access the user interface 108 by logging in to the online account. This may involve the user 106 authenticating with the computer system 134. For example, the user 106 can provide a username and password associated with the online account to the computer system 134. Upon authenticating the username and password, the computer system 134 may allow the user 106 to access the user interface 108. In some cases, the user interface 108 may be part of an application executing on the user device 102. In other cases, the user interface 108 may be part of a website accessible via a website browser. The user interface 108 may allow the user to perform account functions related to the underlying account 116 hosted by the service provider 112.

In some examples, the computer system 134 includes an eligibility analyzer 122. The eligibility analyzer 122 can retrieve usage data 129 related to the account 116 from the account subsystem 114. An example of the usage data 128 can an account history describing prior usage of the account 116. The eligibility analyzer 122 can analyze any amount of the usage data 128 to determine whether the user 106 is eligible for a service 120 offered by the service provider 112. The service 120 can be distinct from the account 116 and offered separately from the account 116. The eligibility analyzer 122 can determine whether the user 106 is eligible for a service 120 based on any suitable criteria, such as a balance in the account 116 or a pattern of usage of the account 116.

In some examples, the eligibility analyzer 122 can include one or more models configured to receive the usage data 128 as input and generate an output indicating the eligibility of the user 106 for the service 120. The models may include a machine-learning model or another type of model. Examples of the machine-learning model may include neural network or classifier. The machine-learning model may go through a training process to tune weights therein prior to being deployed for use. The training process may include supervised training or unsupervised training, depending on the type of model used and the training data that is available. In some cases, the training data used in the training process may include usage histories that are pre-labeled as eligible or ineligible for the service 120.

Depending on the results from the eligibility analyzer 122, the user 106 may be deemed eligible for the service 120. If the user 106 is deemed eligible for the service 120, the computer system 134 can transmit a notification to the user (e.g., via the user interface 108, an email, an SMS message, etc.) indicating that the user 106 is eligible for the service 120. The notification may request that user 106 approve or deny the service 120. If the user approves the service 120, the computer system 134 may activate the service 120 for the user 106 and transmit another notification to the user 106 indicating that the service 120 is now available. Activating the service 120 may involve transmitting a communication to a service subsystem 118 that is configured to manage the service 120 for users. In response to receiving the communication, the service subsystem 118 may perform one or more operations to activate the service 120 for the user 106. For example, the service subsystem 118 can add an entry to a table indicating that the service 120 is active for the user 106.

With the service 120 now active, the user 106 may want to initiate and configure use of the service 120. To that end, the computer system 134 may update the user interface 108 to include graphical features through which the user 106 can control how requests are to be distributed between the service subsystem 118 and the account subsystem 114. The requests can be associated with transactions engaged in by the user using the card 132. For example, the user 106 may interact with the user interface 108 to select that some types of transactions should be handled using the service 120 and other types of transactions should be handled using the account 116. As one such example, the user 106 may select that transactions relating to one entity (e.g., third party 104) should be handled using the service 120 and transactions relating to another entity (e.g., user device 102) should be handled using the account 116. Through the user interface 108, the user 106 can selectively assign transactions with any characteristic or characteristics to either the service 120 or the account 116 as desired. In this way, the user 106 can choose how transactions are to be handled by the computer system 134, which in turn can dictate how corresponding requests are routed through the computer system 134.

Once the user 106 has input the selections via the user interface 108, the computer system 134 may receive the selections and generate corresponding control data 136. The computer system 134 can then supply the control data 136 to a routing application 124. The control data 136 can configure the routing application 124 to implement the user's selections. For example, the control data 136 can include a mapping that correlates certain transaction characteristics to certain destinations, such as the account subsystem 114 or the service subsystem 118.

With the routing application 124 configured, the routing application 124 may forward subsequent requests to the appropriate destination. For example, the computer system 134 may receive a request 126 from a third party 104. The request 126 may include transaction data related to an online or in-store payment made using the card 132 (e.g., information located on the card 132) or another type of transaction. The computer system 134 can forward the request 126 to the routing application 124, which can analyze the transaction data to determine one or more characteristics associated with the request 126. Examples of such request characteristics can include (i) a third party that is associated with the request 126, (ii) a geographical location that is associated with the request 126, (iii) an amount that is associated with the request 126, (iv) a type of resource associated with the request 126, or (v) any combination of these. Upon receiving the request 126, the routing application 124 can access the control data 136 to determine the appropriate destination for requests having the determined characteristics. For example, the routing application 124 can access the control data 136 to determine that the request 126 is to be routed to the service subsystem 118 based on the request 126 being associated with a first type of resource. The service subsystem 118 can be configured to complete (e.g., handle) the request 126 using the service 120. Alternatively, the routing application 124 can access the control data 136 to determine that the request 126 is to be routed to the account subsystem 114 based on the request 126 being associated with a second type of resource that is different from the first type of resource. The account subsystem 114 can be configured to handle the request 126 using the account 116. In this way, the routing application 124 can automatically direct requests to either the service subsystem 118 or the account subsystem 114 depending on the characteristics of the requests (e.g., the transactional data therein) and the user's selections.

As the user 106 continues to use the account 116 over time (e.g., to engage in online transactions using the account 116), the usage data 128 may be updated accordingly. So, the eligibility analyzer 122 may periodically reassess (e.g., monthly) the eligibility of the user 106 for the service 120. If the eligibility analyzer 122 subsequently determines that the user 106 is no longer eligible for the service 120, the eligibility analyzer 122 may transmit a communication to the service subsystem 118 to deactivate the service 120 for the user 106. In response to receiving the communication, the service subsystem 118 may perform one or more operations to deactivate the service 120 for the user 106. For example, the service subsystem 118 can remove an entry from a table of users for which the service 120 is active. Additionally or alternatively, the eligibility analyzer 122 can generate corresponding control data 136 and supply the control data 136 to the routing application 124. The control data 136 can configure the routing application 124 to route future requests associated with the user 106 to a default destination, such as the account subsystem 114. This may be the default when the service 120 is not active for the user 106. The control data 136 can override a previously stored mapping so that future requests are routed to the default destination, independently of the user's selections.

Once the service 120 is deactivated for the user 106, the user may 106 remain ineligible for the service 120 until the next time window begins. At that point, the above process can repeat with the eligibility analyzer 122 determining whether the user 106 is eligible to use the service 120 during that time window. In this way, access to the service 120 may be limited in duration to a particular time window and the computer system 134 can automatically control access to the service 120 during that time window.

As noted above, the computer system 134 may automatically and periodically assess whether the user 106 is eligible for the service 120. In some examples, the user 106 may also be able to request access to the service 120. For example, the user 106 may select a button in the user interface 108 for requesting access to the service 120. In response to the selection, the user device 102 may transmit a request to the computer system 134 to access the service 120. Based on receiving the request, the computer system 134 can execute the eligibility analyzer 122 to determine whether the user 106 is eligible to use the service 120. If the eligibility analyzer 122 determines that the user 106 is eligible, the computer system 134 may activate the service 120 for the user 106. Otherwise, the computer system 134 may transmit a response to the request indicating that the user 106 is currently ineligible for the service 120. In this way, the user 106 may be able to request the service 120 as desired.

It will be appreciated that the example shown in FIG. 1 is intended to be illustrative and non-limiting. Other examples may include more components, fewer components, different components, or a different combination of the components than are shown in FIG. 1. For instance, in another example the eligibility analyzer 122 and the routing application 124 may be combined into a single software module that is capable of implementing both of their functionalities. And although FIG. 1 involves distributing requests between two different subsystems (the service subsystem 118 and the account subsystem 114), other examples may involve a larger number of subsystems and more-complex routing schemes through which the user 106 can select among a larger number of options for handling requests.

Figure 2:
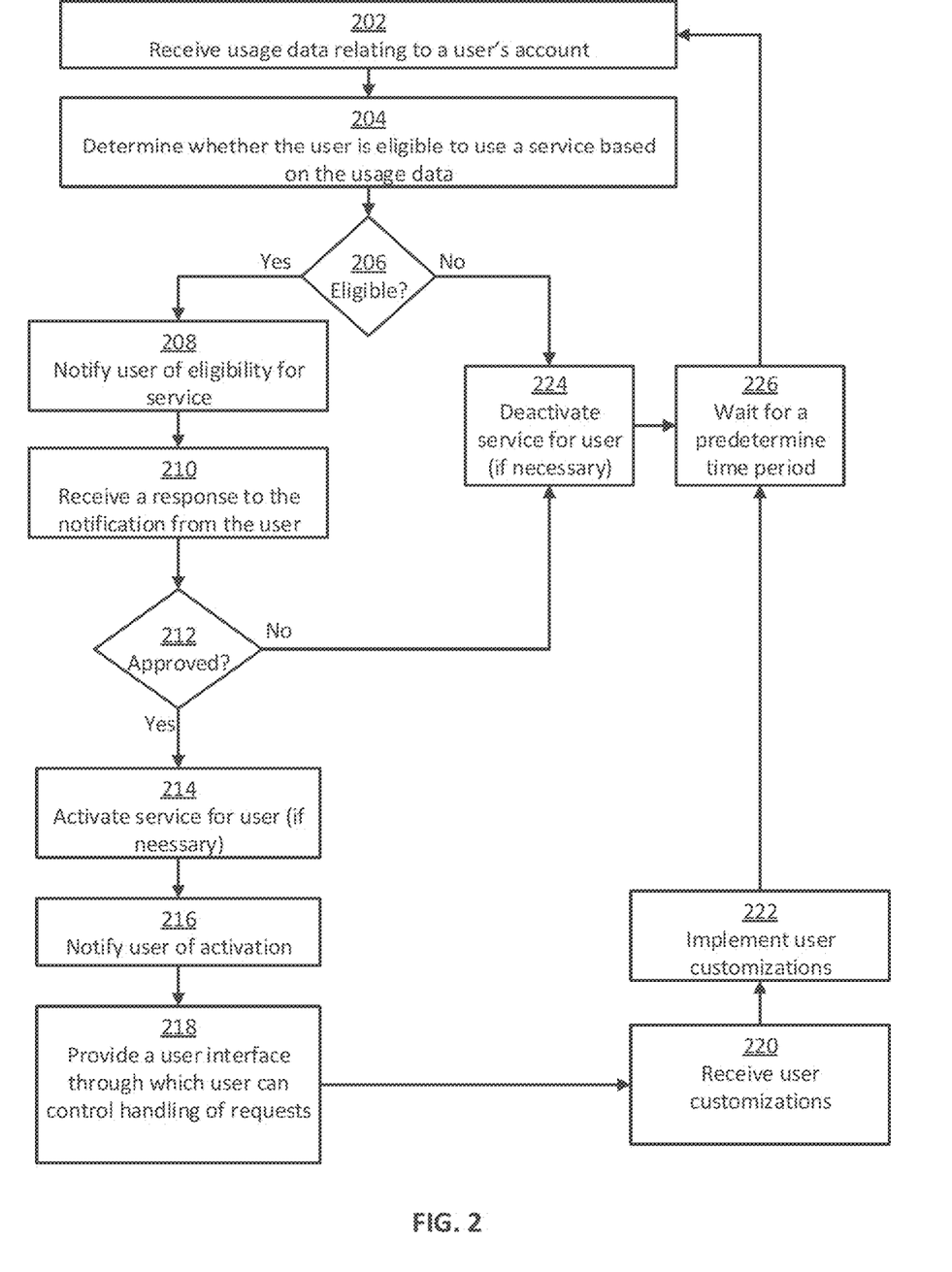
FIG. 2 is a flow chart of an example of a process for implementing some aspects of the present disclosure.

FIG. 2 is a flow chart of an example of a process for implementing some aspects of the present disclosure. Other examples may involve more operations, fewer operations, different operations, or a different order of the operations than are shown in FIG. 2. The operations below will now be described with reference to the components of FIG. 1 above.

In block 202, an eligibility analyzer 122 receives usage data 128 relating to an account 116 of a user 106. The eligibility analyzer 122 may receive the usage data 128 from an account subsystem 114 or another subsystem of a computer system 134 operated by a service provider 112. The eligibility analyzer 122 can also be part of the computer system 134 and may be configured to determine the eligibility of the user 106 for a service 120. An example of the service 120 may be a credit service for providing the user 106 with a credit line.

In block 204, the eligibility analyzer 122 determines whether the user 106 is eligible for the service 120 based on the usage data 128. This may involve comparing a pattern of usage expressed in the usage data 128 to one or more predefined criteria. In some examples, the eligibility analyzer 122 may employ a model, such as a machine-learning model, to determine whether the user 106 is eligible for the service 120. As shown in block 206, the process can branch to block 208 if the user 106 is determined to be eligible for the service 120 or branch to block 224 if the user 106 is determined to be ineligible for the service 120.

In block 208, the computer system 134 notifies the user 106 that the user 106 is eligible for the service 120. For example, the computer system 134 can transmit a message to the user 106 indicating that the user 106 is eligible for the service 120. Additionally or alternatively, the computer system 134 can update a user interface 108 (e.g., of a mobile application or a web interface) to indicate that the user 106 is eligible for the service 120.

In block 210, the computer system 134 receives a response to the notification from the user 106. The response can indicate the user's approval or denial of the service 120. For example, the user 106 can operate a user device 102 to select an "approve" button or a "deny" button within the user interface 108. The user device 102 can detect this selection and transmit a corresponding communication to the computer system 134 indicating the user's selection. The communication can act as a response to the notification provided to the user 106 in block 208.

In block 212, the computer system 134 determines whether the service 120 was approved or rejected by the user 106. The computer system 134 based on the response received in block 210. If the computer system 134 determines that the service 120 was approved, the process can branch to block 214. Otherwise, the process can branch to block 224, where the computer system 134 can deactivate the service 120 for the user 106 (if necessary). If the service 120 was already previously deactivated for the user 106, then the computer system 134 may not need to deactivate the service 120 again. If the service 120 was not already previously deactivated for the user 106, then the computer system 134 can deactivate the service 120. Deactivating the service 120 may involve communicating with a service subsystem 118 to add an entry to a table or remove an entry from a table. Deactivating the service 120 may additionally or alternatively involve generating and transmitting control data to a routing application 124, for example so that subsequent requests related to the user 106 are automatically routed to an account subsystem 114.

In block 214, the computer system 134 activates the service 120 for the user 106 (if necessary). If the service 120 was already previously activated for the user 106, then the computer system 134 may not need to activate the service 120 again. If the service 120 was not already previously activated for the user 106, then the computer system 134 can activate the service 120. Activating the service 120 may involve communicating with a service subsystem 118 to add an entry to a table or remove an entry from a table. In some examples, the entry may include a unique identifier of the user or an account number related to the account 116.

In block 216, the computer system 134 notifies the user 106 that the service 120 is active. For example, the computer system 134 can transmit a message to the user 106 indicating that the service 120 is now active. Additionally or alternatively, the computer system 134 can update a user interface 108 to indicate that the service 120 is now active for the user 106.

Figure 3A:
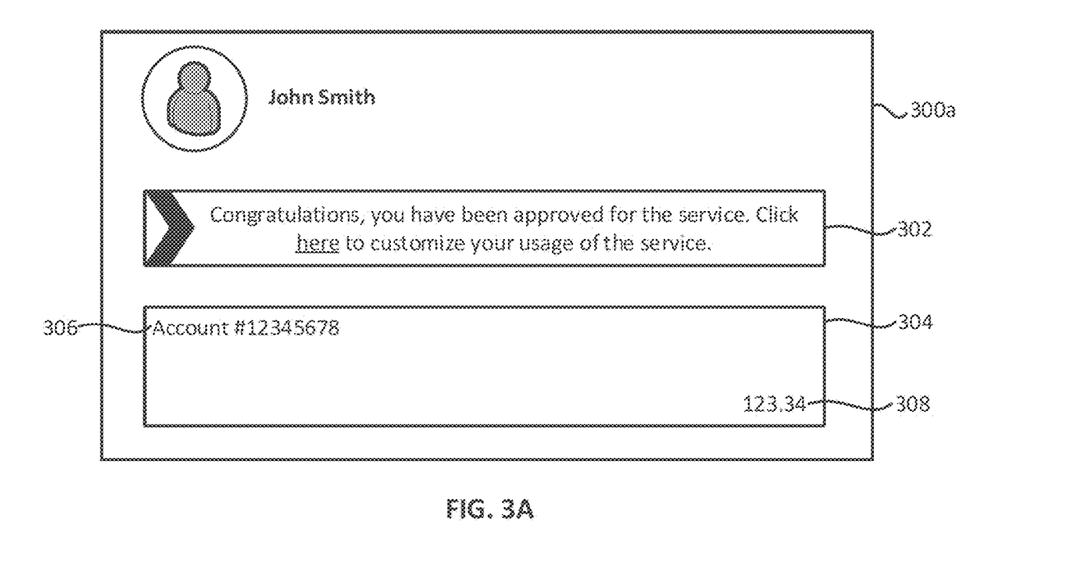
FIGS. 3A-B depict examples of graphical user interfaces for implementing some aspects of the present disclosure.
Figure 3B:
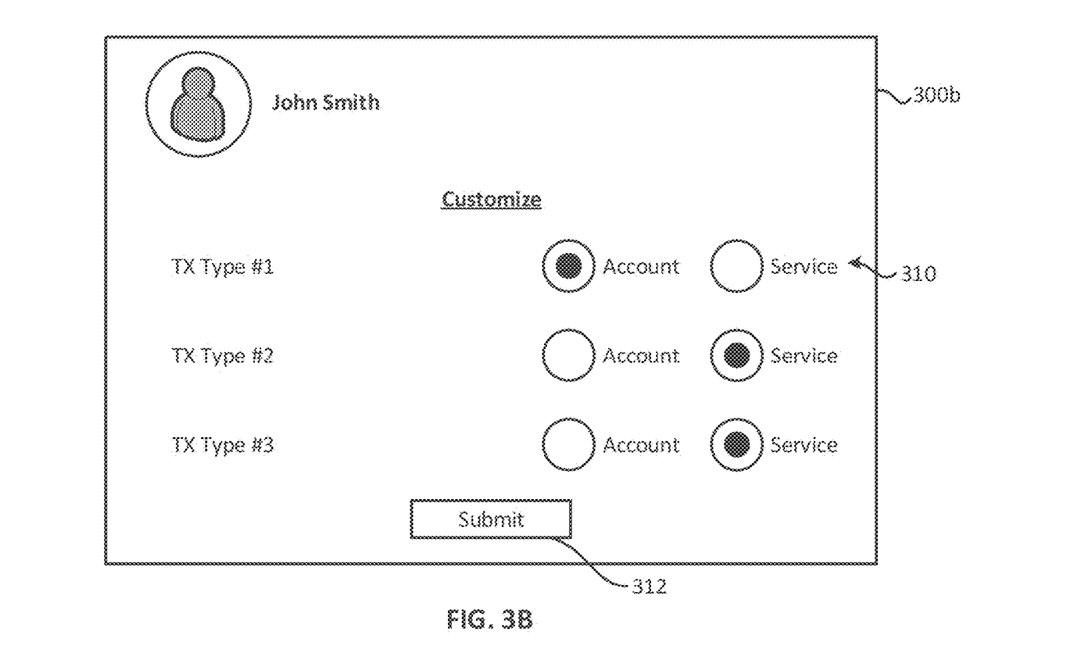

In block 218, the system 100 can provide the user 106 with a user interface 108 through which the user 106 can selectively control how requests are handled by the computer system 134. One example of the user interface 108 is shown in FIGS. 3A-3B. As shown in FIG. 3A, the user interface 108 may include an interface page 300a that may be displayed on the user device 102. The interface page 300a can include a notification 302 indicating that the service 120 is now active for the user 106. The interface page 300a may additionally or alternatively include account data 304 related to the user's account 116. The account data 304 can describe one or more characteristics of the account 116. Examples of the account data 304 can include an account name, number 306, balance 308, or other characteristic. In some examples, the user 106 can select a graphical element, such as the notification 302, within the interface page 300a to transition to another interface page 300b, through which the user 106 may be able to selectively control how requests are to be handled.

An example of the other interface page 300b is shown in FIG. 3B. As shown, the interface page 300b can include selection options 310, which can include any suitable type of graphical elements such as radio buttons, check boxes, pull down menus, icons, text boxes, etc. The user 106 may interact with the selection options 310 to select how different types of transactions (abbreviated "TX" in FIG. 3B) are to be handled by the service provider 112. In the example shown in FIG. 3B, the user 106 selected that TX Type #1 is be completed using the account 116, TX Type #2 is to be completed using the service 120, and TX Type #3 is to be completed using the service 120. But other examples may involve more options. Once the user 106 has input the selections, the user 106 can interact with a submit button 312 to finalize the process. In response to detecting such an interaction, the user device 102 can transmit the user's selections to the computer system 134.

Continuing with FIG. 2, in block 220 the computer system 134 receives the user's customizations as to how to handle different types of transactions. For example, the computer system 134 can receive the selections input by the user 106 to the interface page 300b described above. The computer system 134 may receive the user customizations in one or more communications transmitted by the user device 102 via a network 110.

In block 222, the computer system 134 implements the user's customizations. This may involve generating and transmitting control data to the routing application 124 to configure the routing application 124 in accordance with the user's customizations. As a result, subsequent requests related to the user 106 may be distributed between the account subsystem 114 and the service subsystem 118 in a manner that complies with the user's selections.

In some examples, the process can repeat over time. For example, the process can include block 226 during which the computer system 134 can wait for a predetermined time period. Upon the expiration of the predetermined time period, the process can return to block 202 and restart with the receipt of updated usage data relating to the user's account 116.

Figure 4:
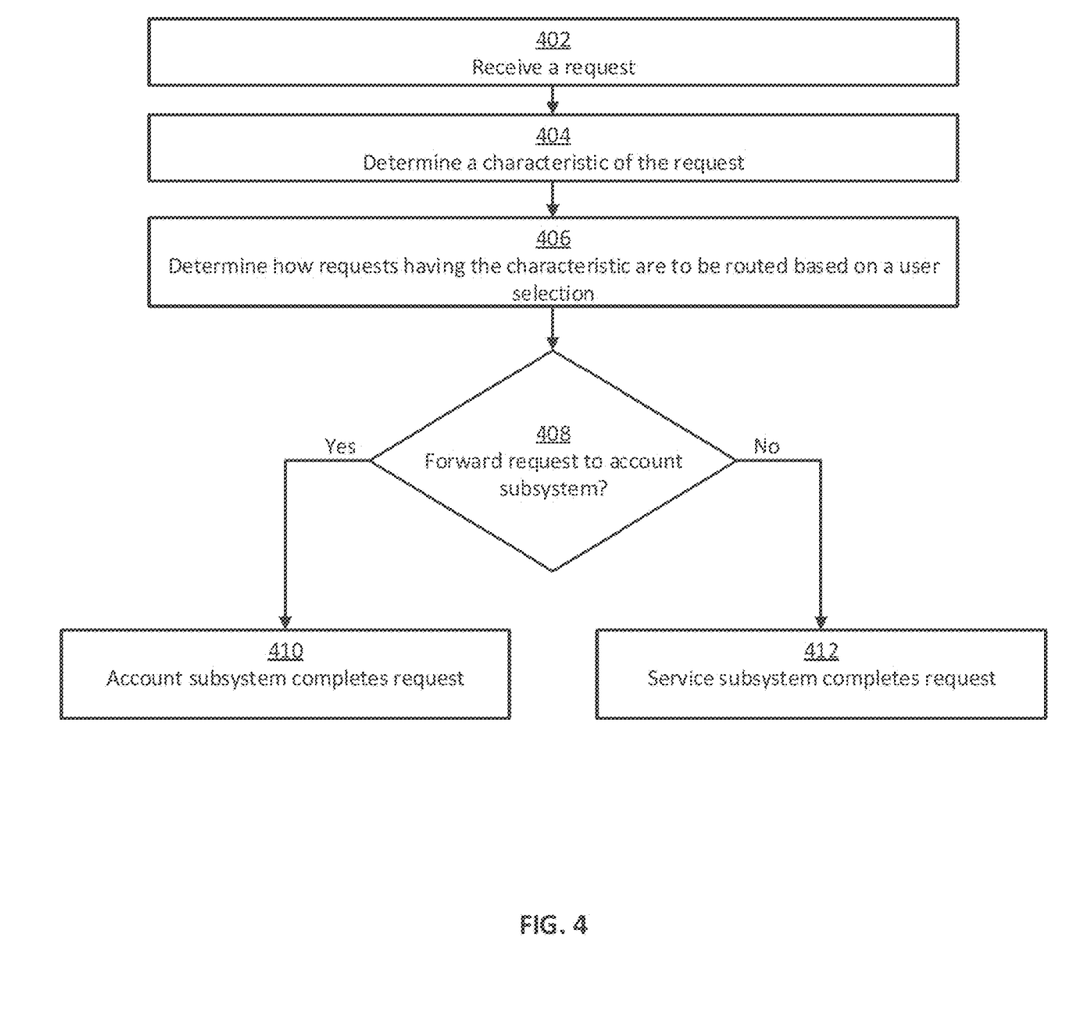
FIG. 4 is a flow chart of an example of a routing process for implementing some aspects of the present disclosure.

FIG. 4 is a flow chart of an example of a process for implementing some aspects of the present disclosure. Other examples may involve more operations, fewer operations, different operations, or a different order of the operations than are shown in FIG. 4. The operations below will now be described with reference to the components of FIG. 1 above.

In block 402, a computer system 134 receives a request 126, such as a network request. The computer system 134 can receive the request 126 via the network 110. In some examples, the request 126 may correspond to an activity performed by a user 106 in relation to a third party 104, such as swiping a card 132 owned by the user 106.

In block 404, the computer system 134 determines a characteristic of the request 126. This may involve analyzing the headers or payloads of one or more data packets associated with the request 126. For example, the computer system 134 may extract the payload data from one or more data packets associated with the request 126 and analyze the payload data to determine the characteristic.

In block 406, the computer system 134 determines how requests having the characteristic are to be routed based on a user selection. For example, the computer system 134 may include a routing application 124 storing control data 136 that was previously generated or updated based on the user selection. The control data 136 can specify how requests having the characteristic are to be routed. The routing application 124 can access the control data 136 to determine how requests having the characteristic are to be routed.

In block 408, the computer system 134 (e.g., the routing application 124) determines whether the request 126 is to be forwarded to an account subsystem 114 based on the determination made in block 406. In some examples, the computer system 134 may be configured to forward the request 126 to the account subsystem 114 by default.

If the computer system 134 determines that the request 126 is to be forwarded to the account subsystem 114, the process can proceed to block 410 where the computer system 134 can transmit the request 126 to the account subsystem 114. Otherwise, the process can proceed to block 412 where the computer system 134 can transmit the request 126 to a service subsystem 118.

Figure 5:
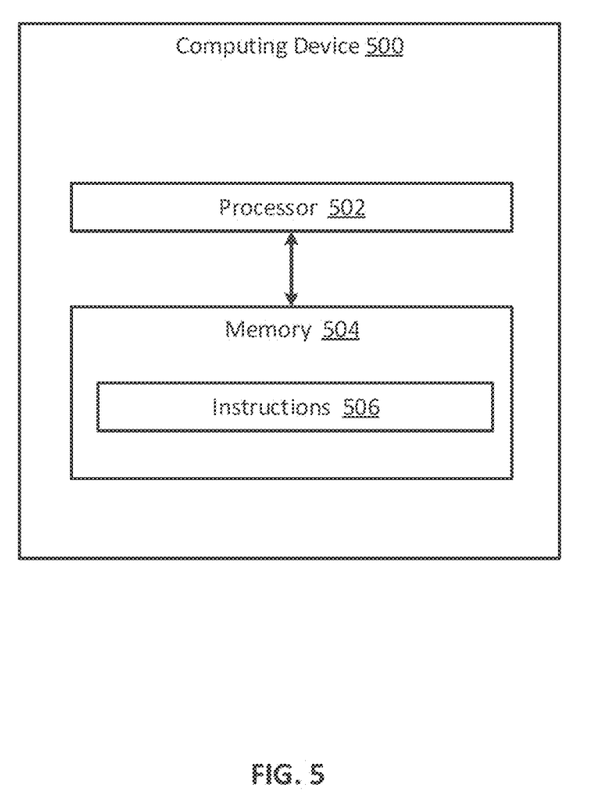
FIG. 5 is a block diagram of an example of a computing device for implementing some aspects of the present disclosure.

FIG. 5 is a block diagram of an example of a computing device 500 for implementing some aspects of the present disclosure. The computing device 500 may correspond to the user device 102 or may be part of the computer system 134 described above.

The computing device 500 includes a processing device 502 coupled to a memory device 504 via a bus. The processing device 502 can include one processing device or multiple processing devices. Non-limiting examples of the processing device 502 include a Field-Programmable Gate Array (FPGA), an application-specific integrated circuit (ASIC), a microprocessor, etc. The processing device 502 can execute instructions 506 stored in the memory device 504 to perform operations. Examples of such operations can include any of the operations described above with respect to the user device 102 or the computer system 134. In some examples, the instructions 506 can include processor-specific instructions generated by a compiler or an interpreter from code written in any suitable computer-programming language, such as C, C++, C#, etc.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device can include a medium from which the processing device 502 can read instructions 506. A computer-readable medium can include electronic, optical, magnetic, or other storage devices capable of providing the processing device 502 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 506.

The computing device 500 may also include other input and output (I/O) components, which are not shown here for simplicity. Examples of such input components can include a mouse, a keyboard, a trackball, a touch pad, and a touch-screen display. Examples of such output components can include a visual display, an audio display, and a haptic display. Examples of a visual display can include a liquid crystal display (LCD), a light-emitting diode (LED) display, and a touch-screen display. An example of an audio display can include speakers. An example of a haptic display may include a piezoelectric vibration device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
one or more processors; and
a memory including program code that is executable by the one or more processors for causing the one or more processors to:

generate a graphical user interface through which a user can apply one or more card controls in relation to a card, wherein the one or more card controls dictate whether transactions initiated using the card are to be handled using an account subsystem hosted by a service provider or a service subsystem hosted by the service provider, the account subsystem being different from the service subsystem;

receive an input from the user, via the graphical user interface, for applying a card control to the card; and in response to receiving the input, cause the service provider to handle transactions associated with the card in accordance with the card control.

2. The system of claim 1, wherein the card control dictates that the transactions are to be completed using an account of the user with the service provider, and wherein causing the service provider to handle the transactions associated with the card in accordance with the card control involves:

transmitting the transactions to the account subsystem, the account subsystem being configured to handle the transactions using the account.

3. The system of claim 1, wherein the card control dictates that the transactions are to be completed using a service offered to the user by the service provider, and wherein causing the service provider to handle the transactions associated with the card in accordance with the card control involves:

transmitting the transactions to the service subsystem, the service subsystem being configured to handle the transactions using the service.

4. The system of claim 3, wherein the memory further includes program code that is executable by the one or more processors for causing the one or more processors to:

determine that the user is eligible for the service; and transmit an indication to the user that the user is eligible for the service.

5. The system of claim 1, wherein the system is operated by the service provider.

6. The system of claim 1, wherein the memory further includes program code that is executable by the one or more processors for causing the one or more processors to:

receive requests associated with the transactions between the user with an entity, the entity being different from the user and the service provider.

7. The system of claim 1, wherein the memory further includes program code that is executable by the one or more processors for causing the one or more processors to:

access control data that correlates transaction types to destinations, wherein a first type of transaction is correlated in the control data to the account subsystem, and wherein a second type of transaction is correlated in the control data to the service subsystem; and determine, using the control data, that a first request is to be transmitted to the account subsystem and a second request is to be transmitted to the service subsystem.

8. A method comprising:

generating a graphical user interface through which a user can apply one or more card controls in relation to a card, wherein the one or more card controls dictate whether transactions initiated using the card are to be handled using an account subsystem hosted by a service provider or a service subsystem hosted by the service provider, the account subsystem being different from the service subsystem;

receiving an input from the user, via the graphical user interface, for applying a card control to the card; and in response to receiving the input, causing the service provider to handle transactions associated with the card in accordance with the card control.

9. The method of claim 8, wherein the card control dictates that the transactions are to be completed using an account of the user with the service provider, and wherein causing the service provider to handle the transactions associated with the card in accordance with the card control involves:

transmitting the transactions to the account subsystem, the account subsystem being configured to handle the transactions using the account.

10. The method of claim 8, wherein the card control dictates that the transactions are to be completed using a service offered to the user by the service provider, and wherein causing the service provider to handle the transactions associated with the card in accordance with the card control involves:

transmitting the transactions to the service subsystem, the service subsystem being configured to handle the transactions using the service.

11. The method of claim 8, further comprising:

determining that the user is eligible for the service; and transmitting an indication to the user that the user is eligible for the service.

12. The method of claim 8, further comprising:

receiving requests associated with the transactions between the user with an entity, the entity being different from the user and the service provider.

13. The method of claim 8, further comprising:

accessing control data that correlates transaction types to destinations, wherein a first type of transaction is correlated in the control data to the account subsystem, and wherein a second type of transaction is correlated in the control data to the service subsystem; and determining, using the control data, that a first request is to be transmitted to the account subsystem and a second request is to be transmitted to the service subsystem.

14. A non-transitory computer-readable medium comprising program code that is executable by one or more processors for causing the one or more processors to:

generate a graphical user interface through which a user can apply one or more card controls in relation to a card, wherein the one or more card controls dictate whether transactions initiated using the card are to be handled using an account subsystem hosted by a service provider or a service subsystem hosted by the service provider, the account subsystem being different from the service subsystem;

receive an input from the user, via the graphical user interface, for applying a card control to the card; and in response to receiving the input, cause the service provider to handle transactions associated with the card in accordance with the card control.

15. The non-transitory computer-readable medium of claim 14, wherein the card control dictates that the transactions are to be completed using an account of the user with the service provider, and wherein causing the service provider to handle the transactions associated with the card in accordance with the card control involves:

transmitting the transactions to the account subsystem, the account subsystem being configured to handle the transactions using the account.

16. The non-transitory computer-readable medium of claim 14, wherein the card control dictates that the transactions are to be completed using a service offered to the user by the service provider, and wherein causing the service provider to handle the transactions associated with the card in accordance with the card control involves:
   transmitting the transactions to the service subsystem, the service subsystem being configured to handle the transactions using the service.

17. The non-transitory computer-readable medium of claim 14, further comprising program code that is executable by the one or more processors for causing the one or more processors to:
   determine that the user is eligible for the service; and
   transmit an indication to the user that the user is eligible for the service.

18. The non-transitory computer-readable medium of claim 14, further comprising program code that is executable by the one or more processors for causing the one or more processors to:
   receive requests associated with the transactions between the user with an entity, the entity being different from the user and the service provider.

19. The non-transitory computer-readable medium of claim 14, further comprising program code that is executable by the one or more processors for causing the one or more processors to:
   access control data that correlates transaction types to destinations, wherein a first type of transaction is correlated in the control data to the account subsystem, and wherein a second type of transaction is correlated in the control data to the service subsystem; and
   determine, using the control data, that a first request is to be transmitted to the account subsystem and a second request is to be transmitted to the service subsystem.

20. The non-transitory computer-readable medium of claim 14, wherein the graphical user interface includes a plurality of graphical elements corresponding to a plurality of card controls, each of the plurality of graphical elements being selectable to apply a corresponding card control to the card.

\* \* \* \* \*